(12) United States Patent
Hiles et al.

(10) Patent No.: US 7,581,188 B2
(45) Date of Patent: Aug. 25, 2009

(54) CONTEXT-BASED USER INTERFACE SYSTEM

(75) Inventors: Paul E. Hiles, Houston, TX (US); Chris Moehring, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 393 days.

(21) Appl. No.: 11/527,844

(22) Filed: Sep. 27, 2006

(65) Prior Publication Data

US 2008/0077865 A1 Mar. 27, 2008

(51) Int. Cl.
*G06F 3/00* (2006.01)
*G06F 3/14* (2006.01)
*G09G 5/00* (2006.01)

(52) U.S. Cl. .................. 715/744; 715/765; 715/864; 701/36

(58) Field of Classification Search .......... 715/700, 715/744, 745, 764, 765, 864, 866, 788, 789, 715/810, 811; 701/1, 24, 36
See application file for complete search history.

(56) References Cited

U.S. PATENT DOCUMENTS

| | | | |
|---|---|---|---|
| 5,898,434 A | 4/1999 | Small et al. | |
| 6,400,996 B1 * | 6/2002 | Hoffberg et al. | 700/83 |
| 6,912,386 B1 | 6/2005 | Himberg et al. | |
| 6,925,603 B1 * | 8/2005 | Naito et al. | 715/733 |
| 6,948,135 B1 | 9/2005 | Ruthfield et al. | |
| 7,012,607 B1 | 3/2006 | Kurlander et al. | |
| 7,022,075 B2 | 4/2006 | Grunwald et al. | |
| 7,400,316 B2 * | 7/2008 | Appleyard et al. | 345/156 |
| 2002/0160817 A1 | 10/2002 | Salimaa et al. | |
| 2002/0188391 A1 * | 12/2002 | Takahashi et al. | 701/36 |
| 2004/0107072 A1 * | 6/2004 | Dietrich et al. | 702/153 |
| 2004/0186632 A1 * | 9/2004 | Arai | 701/1 |
| 2005/0143867 A1 * | 6/2005 | Odinak et al. | 701/1 |
| 2005/0219228 A1 | 10/2005 | Alameh et al. | |
| 2006/0143298 A1 | 6/2006 | Anttila et al. | |
| 2007/0143517 A1 * | 6/2007 | Matthews et al. | 710/303 |

FOREIGN PATENT DOCUMENTS

EP 0801342 10/1997

OTHER PUBLICATIONS

International Search Report Dated May 9, 2008.

\* cited by examiner

*Primary Examiner*—X. L Bautista

(57) ABSTRACT

An electronic device user interface system comprising a user interface management module configured to select a user interface content mode based on a signal indicative of a context of the electronic device.

21 Claims, 2 Drawing Sheets

CONTEXT-BASED USER INTERFACE SYSTEM

BACKGROUND OF THE INVENTION

User interfaces of electronic devices require input from the user to change and/or modify the user interface. For example, when the user desires to change the user interface, a user must manually provide input into the electronic device such as, for example, invoking menu options. However, such manual inputs are oftentimes cumbersome and time-consuming, especially for small electronic devices.

BRIEF DESCRIPTION OF THE DRAWINGS

For a more complete understanding of the present invention, and the objects and advantages thereof, reference is now made to the following descriptions taken in connection with the accompanying drawings in which.

DETAILED DESCRIPTION OF THE DRAWINGS

Figure 1:
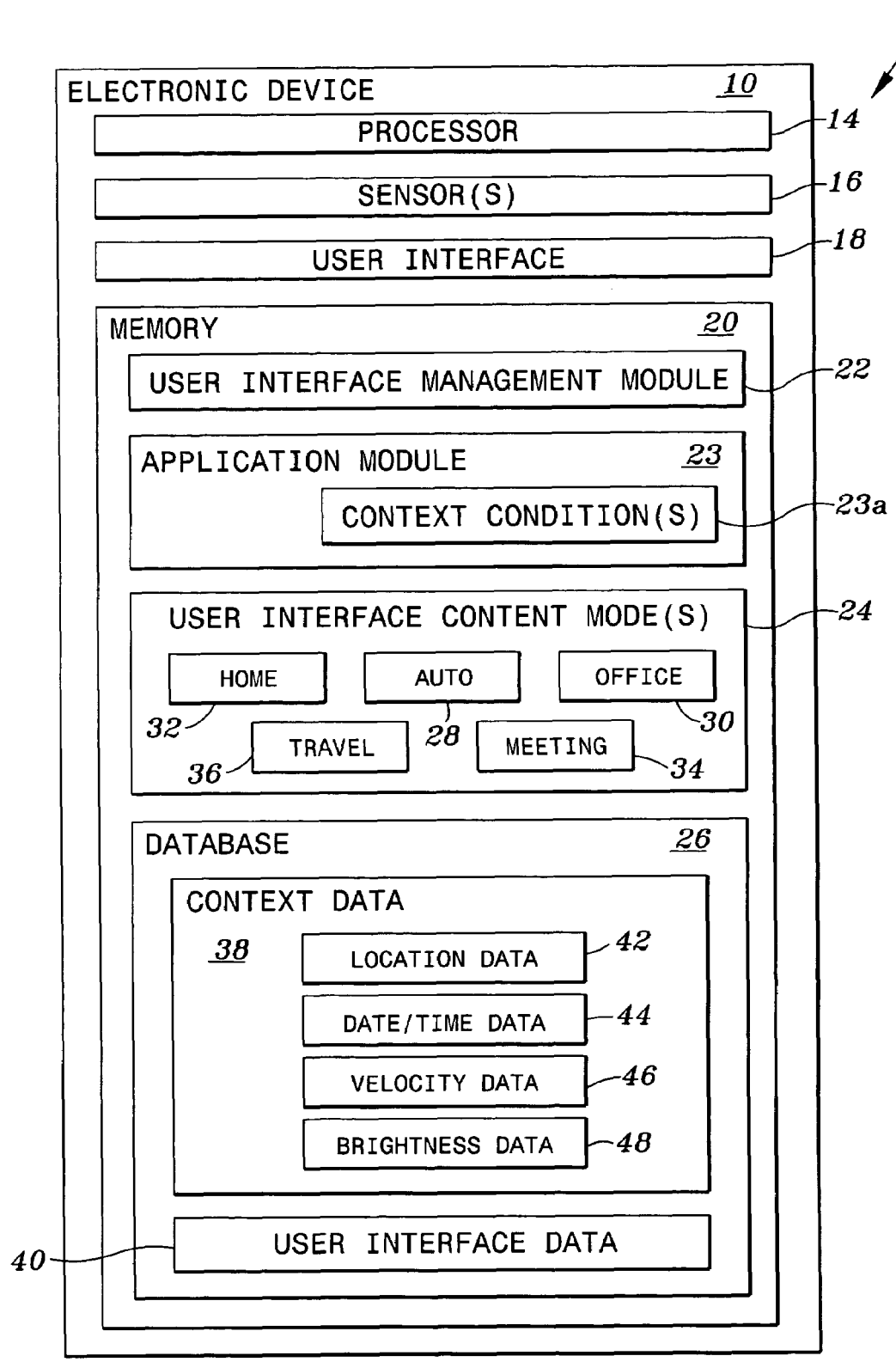
FIG. 1 is a block diagram of an electronic device in which an embodiment of a context-based user interface system in accordance with the present invention is employed to advantage.
Figure 2:
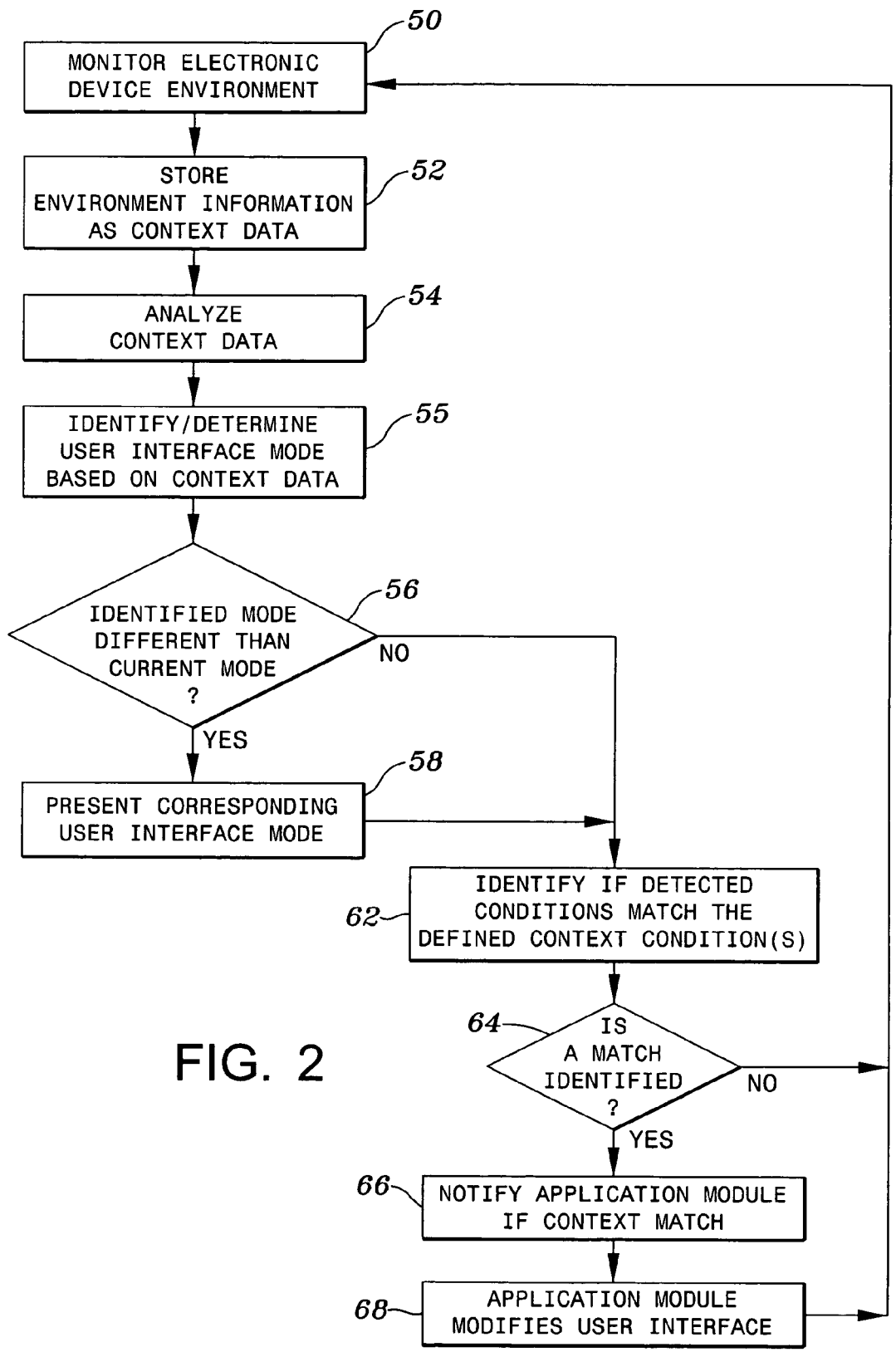
FIG. 2 is a flow diagram illustrating an embodiment of the context-based user interface method in accordance with the present invention.

The preferred embodiments of the present invention and the advantages thereof are best understood by referring to FIGS. 1 and 2 of the drawings, like numerals being used for like and corresponding parts of the various drawings.

FIG. 1 is a block diagram of an electronic device 10 in which an embodiment of a context-based user interface system 12 in accordance with the present invention is employed to advantage. Electronic device 10 may comprise any type of electronic device such as, but not limited to, a computing device, a personal digital assistant, a cellular telephone, a music player, a gaming device, or any other portable or non-portable electronic device. In the embodiment illustrated in FIG. 1, electronic device 10 comprises a processor 14, sensor(s) 16, a user interface 18, and a memory 20.

In the embodiment illustrated in FIG. 1, memory 20 comprises a user interface management module 22, an application module 23, a user interface content mode(s) 24, and a database 26. User interface management module 22 and application module 23 may comprise hardware, software, firmware, or a combination thereof. In FIG. 1, user interface management module 22 and application module 23 are illustrated as being stored in memory 20 so as to be accessible and/or executable by processor 14. However, it should be understood that user interface management module 22 and application module 23 may be otherwise stored.

In operation, user interface management module 22 is used to process signals detected by sensor(s) 16 to automatically configure user interface 18 to operate according to the current context (e.g., the environment in which electronic device 10 is operating or being utilized). For example, if electronic device 10 is being utilized by a user while the user is driving an automobile, user interface management module 22 processes signals detected by sensor(s) 16 indicating use of electronic device 10 in an automobile to automatically configure user interface 18 to present to the user a user interface configured for use within an automobile (e.g., a user interface having large icons, voice-activated applications and/or input, automatic launching of global positioning/mapping software, etc.). In operation, application module 23 is used to enable a user to define and register desired contexts so as to permit user interface 18 to be automatically configured according to the desired and/or defined context.

According to embodiments of the present invention, user interface content mode(s) 24 comprises one or more user interface content modes to enable user interface 18 to be automatically configured for use and operation according to the current context in which electronic device 10 is being operated or utilized. User interface content mode(s) 24 may comprise, but not be limited to, an automobile user interface content mode 28 (e.g., for when using electronic device 10 in an automobile), an office user interface content mode 30 (e.g., for when utilizing electronic device 10 in the user's office), a home user interface content mode 32 (e.g., for when utilizing electronic device 10 at home), a meeting user interface content mode 34 (e.g., for when utilizing electronic device 10 in a meeting), and a travel user interface content mode 36 (e.g., for when utilizing electronic device 10 while traveling). It should be understood that user interface content mode(s) 24 may comprise interface content modes corresponding to other criteria, such as being on vacation, on a business trip, grocery shopping, in a shopping mall, in an airport and/or during special calendar events.

In some embodiments of the present invention, automobile user interface content mode 28 utilizes large icons, voice-activated and/or voice-responsive software, and is configured to automatically launch certain software applications such as, for example, global-positioning and/or mapping software. In some embodiments of the present invention, office user interface content mode 30 automatically launches software applications and/or provides a link to software used on a daily basis at the office (e.g., e-mail software, accounting software, etc.). Home user interface content mode 32 automatically launches software primarily used in a user's home such as, for example, a home e-mail software package and/or an Internet browser. In some embodiments of the present invention, meeting user interface content mode 34 automatically mutes any sound produced by electronic device 10 such as, for example, e-mail and battery alerts, and launches note-taking software applications or any other software commonly used in a meeting environment. According to some embodiments of the present invention, travel user interface content mode 36 automatically provides a user interface to enable a user to conveniently operate electronic device 10 while traveling, such as on a vacation or business trip. For example, travel user interface 36 automatically launches mapping software to enable a user to navigate (e.g., providing a map from an airport to the user's hotel). Further, travel user interface 36 automatically launches applications to provide a listing of available hotel rooms, nearby restaurants, and flight information. It should also be understood that particular content modes 24 may result in particular applications being automatically closed. Each content mode 28, 30, 32, 34 and 36 is preferably pre-configured to present a particular content interface and/or automatically launch particular applications. However, it should be understood that each mode 28, 30, 32, 34 and 36 may be modified by a user, initially set up or configured by a user, or set up by a user based on a pre-configured template. Accordingly, it should be understood that user interface content mode(s) 24 may be developed and/or otherwise configured in a variety of ways.

In the embodiment illustrated in FIG. 1, database 26 comprises context data 38 and user interface data 40. Context data 38 comprises information associated with signals detected and/or otherwise received by sensor(s) 16 such as, by way of example, signals corresponding to location data 42 (e.g., indicating the physical location of electronic device 10 such as a latitude and longitude value, the physical location of a user's home, a physical location of a user's automobile, a physical location of s user's office, etc.), date/time data 44 (e.g., information such as the current date and/or time), velocity data 46 (e.g., indicating whether electronic device 10 is stationary, such as it might be in an office location or, or moving, such as in an automobile or airplane) and brightness data 48 (e.g., indicating the level of light or brightness of the environment in which electronic device is located or being used).

User interface data 40 comprises information used to evaluate context data 38 such as, but not limited to, known and/or predetermined signal values such as known locations corresponding to an office or a home (e.g., latitude/longitude information). Thus, user interface data 40 comprises information used to analyze and/or evaluate context data 38 to determine the context of electronic device 10 (e.g., where and/or how electronic device 10 is being used at a particular time) to enable user interface management module 22 to control and/or otherwise present a corresponding user interface content mode 28, 30, 32, 34 or 36. For example, in some embodiments of the present invention, user interface data 40 comprises known or predetermined values (e.g., latitude/longitude values) corresponding to certain locations such as an office or home location. Thus, if context data 38 corresponding to a latitude/longitude location of electronic device 10 falls within a predetermined range of user interface data 40 to indicate that electronic device 10 is at or near an office location or a home location, user interface management module 22 communicates with and/or otherwise interfaces with processor 14 to cause presentation or display of office user interface content mode 30 or home user interface content mode 32, respectively. It should be understood that additionally or alternatively, user interface management module 22 may be configured to enable a user to selectively choose a particular user interface content mode 28, 30, 32, 34 or 36. For example, in the event that electronic device 10 is used by a passenger in an automobile, it may not be necessary to utilize automobile interface content mode 28. Thus, in this example, a user may selectively choose a different user interface content mode.

In some embodiments of the present invention, user interface data 40 is configured manually (e.g., manually input by the user) and/or pre-programmed (e.g., programmed by a manufacturer). For example, when manually configuring user interface data 40 to correspond to desired locations in which electronic device is used, the user inputs geographic coordinates (e.g., latitude and longitude values) corresponding to the particular location. The geographic input may be in the form of latitude/longitude values input by the user or may be in the form of input to correlate geographic signals currently detected by sensor(s) 16 to a particular location. For example, while using electronic device 10 at the office, a user may indicate that longitude/latitude values currently detected by sensor(s) 16 correspond to a location of the user's office. In some embodiments of the present invention, dates and/or times may be used as user interface data 40 to determine the current context of electronic device 10. For example, certain days of the week and/or times during a particular day may be associated with the user either being in the user's office or at the user's home. Thus, in some embodiments of the present invention, user interface management module 22 is configured to automatically present and/or display a particular interface content mode based on dates and/or time.

According to embodiments of the present invention, sensor(s) 16 may comprise any type of sensor(s) used to measure or detect various conditions such as, but not limited to, position, motion, heat, light, time, date, etc., and then convert the condition into an analog or digital representation. It should be understood that single or multiple sensors 16 may be utilized in connection with electronic device 10. For example, sensor(s) 16 comprise a global positioning sensor used to determine location and/or velocity of electronic device 10. Further, in some embodiments of the present invention, sensor 16 is configured to interface with an internal clock of electronic device 10 to determine and utilize the current time and/or date.

In some embodiments of the present invention, user interface management module 22 is communicatively coupled to one or more software programs or applications residing on electronic device 10, such as a calendar or time management program, such that user interface management module 22 determines a content mode in which to operate electronic device 10 based on information available and/or otherwise obtained from the application(s). For example, if a calendar program stored on electronic device 10 indicates that a user of electronic device 10 is scheduled to attend a meeting, user interface management module 22 automatically configures user interface 18 at the specified date and time to present and/or otherwise use meeting user interface content mode 34.

It should be understood that in some embodiments of the present invention, one or more aspects or parts of interface content modes 28, 30, 32, 34 and/or 36 are combinable such that multiple user interface content modes can be utilized together during operation of electronic device 10. For example, in the event user interface management module 22 determines that electronic device 10 is being utilized in the office (based on location data 42) and user interface management module 22 further determines that electronic device 10 is being operated in a meeting (based on date/time data 44), user interface management module 22 combines and/or otherwise uses features associated with both office user interface 30 and meeting user interface 34. Similarly, in the event that user interface management module 22 determines that electronic device 10 is being operated in an automobile (based on velocity data 46) but that date/time data 44 indicates that electronic device 10 should be in an office environment, user interface management module 22 utilizes and/or otherwise combines features of both automobile user interface content mode 28 and office user interface content mode 30 (e.g., launching and/or maintaining operation of particular applications associated with office use while also presenting voice-responsive and/or other interface options associated with automobile use of electronic device 10). It should be understood that a greater number of user interface content modes may be used in combination, and that various user interface modes may be manually combined by the user (e.g., enabling the user to select and/or otherwise use multiple modes together).

In some embodiments of the present invention, user interface management module 22 comprises a hierarchical user interface rating system. Thus, embodiments of the present invention enable user interface modes 28, 30, 32, 34 and 36, context data 38 and/or user interface data 40 to be prioritized. For example, in some embodiments of the present invention, automobile user interface mode 28 is prioritized higher than home user interface mode 32 for reasons such as safety. In some embodiments of the present invention, if electronic device 10 is more often used at the office, office user interface mode 30 is prioritized higher than home user interface mode 32. Thus, in the event user interface management module determines that electronic device 10 is operating in multiple contexts (e.g., office and meeting, office and car), user interface management module 22 automatically selects the user interface mode assigned the highest priority. For example, in the event that user interface management module 22 determines that electronic device should be operated utilizing office interface content mode 30 (based on date/time data 44) and automobile user interface content mode 28 (based on velocity data 46), user interface management module 22 automatically configures electronic device 10 to operate in the automobile user interface mode 28 if automobile user interface mode 28 was assigned a higher priority.

In some embodiments of the present invention, user interface management module 22 is configured to prevent particular functions and/or applications from being presented and/or made available to a user based on a context in which device 10 is being utilized. For example, in some embodiments of the present invention, if user interface management module 22 is presenting office interface content mode 30 and user interface management module 22 detects that electronic device has transitioned to being used and/or is residing in a moving automobile, user interface management module 22, as part of either office interface content mode 30 or automobile user interface content mode 28, disables and/or otherwise prevents use of particular functions of electronic device (10) (e.g., enabling voice-activated telephone command input while disabling keypad telephone command input).

Application module(s) 23 is configured to enable a user to define and register a desired context to enable electronic device 10 to automatically display particular content, either in combination with an existing user interface content mode 28, 30, 32, 34 and/or 36 or alone as a separate interface content mode. In the embodiment illustrated in FIG. 1, application module(s) 23 defines at least one context condition 23a and registers context condition 23a with user interface management module 22 to enable desired content to be displayed on user interface 18 when the particular context condition 23a exists or is satisfied. Each context condition 23a may be registered with one or more user interface content modes 24 such that, regardless of the particular content mode 24 currently presented, if the context condition 23a is met, particular content is presented. Context condition 23a may comprise, for example, one or more of context data 42, 44, 46 and/or 48 (e.g., being at a particular location at a particular time; being stationary while in an automobile, etc.). Thus, for example, a calendar appointment may be used to define a context condition 23a and registered with office content mode 30, travel content mode 36, home content mode 32 and auto content mode 28. However, it should be understood that context condition(s) 23a may comprise any other type of context data. For example, a user of electronic device 10 may externally couple a sensor such as a temperature sensor to electronic device 10 and configure electronic device 10 to use temperature context data collected by the temperature sensor to determine a particular user interface content mode 24 to present. Additionally, a context condition 23a may be defined as the occurrence of a sequence of events defined by for example, context data 42, 44, 46 and/or 48. For example, in some embodiments, user interface management module 22 detects that electronic device 10 is operating at the office (based on date/time data 44), then is outside (based on brightness data 48) followed by detecting that electronic device 10 in an automobile (based on velocity data 46) to define a context condition 23a (e.g., that the device 10 is in transit).

In operation, when user interface management module 22 detects and/or otherwise determines that a particular context condition 23a is met or has been satisfied, user interface management module 22 sends a signal or otherwise communicates with application module 23 to indicate that the requirements for the particular context condition 23a have been detected. As a result, the particular user interface content mode(s) 28, 30, 32, 34 and/or 36 currently displayed on user interface 18 is dynamically adjusted to display the corresponding content defined by context condition 23a.

For example, in some embodiments of the present invention, a particular context condition 23a may be defined as enabling display of a calendar appointment if velocity data 46 is equal to five miles per hour or less (e.g., indicating that a user may be walking while carrying electronic device 10 or, if in an automobile, indicating that the automobile has slowed or is slowing to a stop). Thus, if user interface management module 22 is currently displaying office user interface content mode 30, and the defined context condition 23a is satisfied, the calendar appointment is displayed. However, if user interface management module 22 is currently displaying auto user interface content mode 28, the calendar appointment will not be displayed until the context condition 23a is satisfied (i.e., the calendar appointment will not be displayed unless the automobile is moving very slow or stopped, thereby preventing a potential distraction to the user). Thus, embodiments of the present invention dynamically configure and/or otherwise modify user interface content modes 24 based on one or more defined context conditions 23a.

FIG. 2 is a flow diagram illustrating an embodiment of a context-based user interface management method in accordance with the present invention. In the embodiment illustrated in FIG. 2, the method begins at block 50, where user interface system 12 monitors the environment in which electronic device 10 is operating or being utilized. For example, sensor 16, such as a global positioning sensor, determines the position of electronic device 10. At block 52, environmental information collected by sensor 16 is stored in memory 20 as context data 38. For example, location data such as latitude and longitude coordinates gathered by sensor 16 are stored in database 26 as location data 42. At block 54, user interface management module 22 analyzes context data 38 (e.g., by comparing context data 38 to user interface data 40). At block 55, system 12 identifies/determines a particular user interface content mode 24 based on context data 38. At decisional block 56, system 12 determines whether the identified mode 24 is different than the currently displayed or presented user interface mode 24. If at decisional block 56 it is determined that the identified content mode 24 is different from the current content mode 24, user interface management module 22 automatically configures electronic device 10 with the determined user interface content mode 28, 30, 32, 34 and/or 36 for operation of electronic device 10, as indicated at block 58. If at decisional block 56 it is determined that the identified mode 24 is not different than the current interface mode 24, the method proceeds to block 62, where system 12 detects whether any context condition(s) 23a based on information detected by sensor(s) 16 is satisfied. If at decisional block 64 it is determined that there is no match, then the method proceeds to block 50, where system 12 continues to monitor the electronic device 10 environment. If at decisional block 64 there is a match, user interface management module 22 notifies application module 23 of the context condition 23a match, as indicated at block 66. At block 68, application module 23 causes the particular content associated with the satisfied context condition 23a to be presented on user interface 18.

Thus, embodiments of the present invention enable a user interface system 12 to process signals received by a sensor 16 to automatically configure electronic device 10 between a plurality of user interface content modes 28, 30, 32, 34 or 36 based on the environment or context in which electronic device is operating or being utilized.

What is claimed is:

1. An electronic device user interface system comprising:
a user interface management module configured to determine whether a sequential context condition has been satisfied and to select a user interface content mode based on a velocity signal indicative of a context of the electronic device, wherein the velocity signal indicates a velocity at which the electronic device is moving, and wherein the sequential context condition comprises a plurality of contexts of the electronic device occurring in a specified sequence.

2. The electronic device of claim 1, wherein the context is based on information detected by a sensor.

3. The electronic device of claim 2, wherein the sensor is a velocity sensor.

4. The electronic device of claim 1, wherein the user interface management module is configured to change the user interface content mode in response to a change in the context.

5. The electronic device of claim 1, wherein the velocity signal is indicative of an "Automobile" context of the electronic device if the velocity signal is above a threshold.

6. The electronic device of claim 5, wherein the velocity signal is indicative of a "Walking" context of the electronic device if the velocity signal is below the threshold.

7. The electronic device of claim 1, wherein the velocity signal determines whether the electronic device is located in an automobile, is located in an airplane, or is being carried by a user on foot.

8. An electronic device user interface method, comprising:
detecting a plurality of contexts in which the electronic device is operating at a given time, each context indicative of a corresponding user interface content mode, wherein each user interface content mode has a priority; and
automatically configuring the electronic device to operate in a highest priority one of the user interface content modes.

9. The method of claim 8, further comprising detecting the contexts based on information detected by at least one sensor.

10. The method of claim 8, further comprising detecting at least one of the contexts based on the location of the electronic device.

11. The method of claim 8, further comprising changing the user interface content mode in response to a change in at least one of the contexts.

12. The method of claim 8, further comprising changing the user interface content mode based on a velocity at which the electronic device is moving.

13. The method of claim 8, further comprising determining whether at least one defined sequential context condition has been satisfied, wherein each defined sequential context condition comprises a plurality of individual context conditions occurring in a specified sequence.

14. The method of claim 13, wherein none of the individual context conditions is satisfied by an instruction provided to the system by a user.

15. The method of claim 8, wherein the priority of each user interface content mode is based on its frequency of use.

16. The method of claim 8, wherein the priority of each user interface content mode is based on the safety of a user of the electronic device.

17. An electronic device user interface system comprising:
a user interface management module having at least one sequential context condition defined by an application module, the application module configured to modify a user interface content mode in response to the sequential context condition being satisfied, wherein each sequential context condition comprises a plurality of individual context conditions occurring in a specified sequence.

18. The system of claim 17, wherein each individual context condition is based on information detected by a sensor.

19. The system of claim 17, wherein at least one of the individual context conditions is based on a velocity at which the electronic device is moving.

20. The system of claim 17, wherein the at least one sequential context condition is registered with at least two different user interface content modes.

21. The system of claim 17, wherein none of the individual context conditions is satisfied by an instruction provided to the system by a user.

* * * * *